(12) United States Patent
Perycz et al.

(10) Patent No.: US 7,010,780 B2
(45) Date of Patent: Mar. 7, 2006

(54) METHOD AND SYSTEM FOR SOFTWARE MODULARIZATION AND AUTOMATIC CODE GENERATION FOR EMBEDDED SYSTEMS

(75) Inventors: Krzysztof S. Perycz, Chmielno (PL); Adam Golichowski, Gdansk (PL); Bohdan T. Iwanojko, Gdansk (PL); Adam Kaminski, Gdansk (PL); Jaroslaw Kogut, Gdansk (PL); Mariusz Oriol, Gdynia (PL); Zbigniew Przekop, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 09/953,277

(22) Filed: Sep. 17, 2001

(65) Prior Publication Data

US 2003/0056193 A1    Mar. 20, 2003

(51) Int. Cl.
*G06F 9/44* (2006.01)
(52) U.S. Cl. .................. 717/107; 717/121; 719/310
(58) Field of Classification Search ........ 717/120–121, 717/100, 106–107, 162; 709/220–224; 719/310–316
See application file for complete search history.

(56) References Cited

U.S. PATENT DOCUMENTS

| 5,737,518 | A  | * | 4/1998  | Grover et al. ............... 714/38 |
| 6,480,597 | B1 | * | 11/2002 | Kult et al. .................. 379/242 |
| 6,697,845 | B1 | * | 2/2004  | Andrews .................... 709/209 |
| 2002/0174207 | A1 | * | 11/2002 | Battou ....................... 709/223 |
| 2002/0198967 | A1 | * | 12/2002 | Iwanojko et al. .......... 709/220 |
| 2003/0023709 | A1 | * | 1/2003  | Alvarez et al. ............ 709/223 |
| 2003/0149735 | A1 | * | 8/2003  | Stark et al. ............... 709/208 |

FOREIGN PATENT DOCUMENTS

JP    03074773 A  *  3/1991

* cited by examiner

Primary Examiner—Antony Nguyen-Ba
(74) *Attorney, Agent, or Firm*—Joni D. Stutman-Horn

(57) ABSTRACT

A system and method for software modularization and automatic code generation for embedded systems is disclosed. An embedded systems software application module is disclosed comprising an initialization/shutdown unit that allows for shutdown and initialization of the module, and a module proper that provides the functionality of the module and having a management/configuration manager interface used to communicate between the module proper and a configuration manager and one or more configuration management units such that the module proper is management access type independent. Optionally, the module may further comprise one or more configuration management units that provide specific management of and interaction with the module proper. There is also provided a toolset to facilitate code generation and development for creating an embedded systems software application from one or more such modules.

40 Claims, 2 Drawing Sheets

METHOD AND SYSTEM FOR SOFTWARE MODULARIZATION AND AUTOMATIC CODE GENERATION FOR EMBEDDED SYSTEMS

BACKGROUND

1. Field of the Invention

This invention relates in general to the field of embedded systems software development. Aspects of this invention relate to methods and systems for software modularization and code generation for embedded systems.

2. General Background and Related Art

Embedded systems software has become and continues to become ubiquitous in modern computer environments. Such systems software comes in many shapes and forms—a prototypical example being the embedded system software in a network router and/or switch—and typically manages and controls the device in which the systems software has been embedded.

Traditionally, embedded systems software is tailored to specific applications (for example, software for use in a network router) by combining together one or more software modules to implement a desired system functionality (for example, handling network traffic by a network router). In a typical development environment, the creation of new applications requires significant modifications to an existing code base (if not a complete re-write). Significant aspects of such re-writing include modification of initialization/shutdown code and system/configuration management code. When creating a new embedded systems software application, new glue code is often needed to integrate the modules of an embedded systems software application and to provide for interoperation with the relevant embedded system device(s) for which the application is being developed. As is often the case, much of such glue code carries over from application to application but often some amount of customization is nevertheless needed. Another significant aspect of the embedded systems application software's code base is configuration/system management code—code which is often manually written, application specific and time consuming to debug and maintain. And, many times such configuration/system management code is duplicative among modules such as validation mechanisms implemented in modules to manage configuration of the application software. Much of this code is also common to different embedded systems software applications.

Accordingly, there is a need in the art for a solution to simplify embedded systems software development by reducing or eliminating re-writing of embedded systems code in order to reduce development time and code complexity, improve code reusability, facilitate portability and stability, and ease code maintenance. Therefore, it would be advantageous to provide a method and system for software modularization and code generation for embedded systems.

BRIEF DESCRIPTION OF THE DRAWINGS

Exemplary embodiments of the invention are illustrated in the accompanying drawings in which like references indicate similar or corresponding elements and in which.

DETAILED DESCRIPTION

A method and system to provide for software modularization and code generation for embedded systems is provided. According to an embodiment of the present invention, there is provided an embedded systems software application module comprising an initialization/shutdown unit that allows for shutdown and initialization of the module, and a module proper that provides the functionality of the module and having a management/configuration manager interface used to communicate between the module proper and a configuration manager or one or more configuration management units such that the module proper is management access type independent. Optionally, the module may further comprise one or more configuration management units that provide specific management of and interaction with the module proper. Also, there is provided according to an embodiment of the invention a toolset to facilitate code generation and development for creating an embedded systems software application from one or more modules implementing specific functionality, comprising an environment to develop an initialization/shutdown unit that allows for shutdown and initialization of the module, and an environment to develop a module proper that provides the functionality of the module, the module proper having a management/configuration manager interface used to communicate between the module proper and a configuration manager or one or more configuration management units such that the module proper is management access type independent. Optionally, there may also be provided as part of the toolset an environment to develop one or more configuration management units that provide specific management of and interaction with the module proper.

An embodiment of the invention provides a solution for embedded systems software development combining, among other things, flexibility, extensibility, code re-use and reduction (or even elimination) of error-prone manual programming. The description herein refers to an embodiment of the invention in the context of a network embedded systems (including the software therefor). Particularly, an embodiment of the invention is described in the context of a network embedded system implementing the Flexible Lightweight Operating System and Services (FLOSS), an operating environment for networking embedded systems and designed for software modularity. Nevertheless, the invention should not be considered limited to such systems or that operating environment and can be applied to other systems and operating environments known to those skilled in the art and as may be particularly illustrated herein from time to time.

Figure 1:
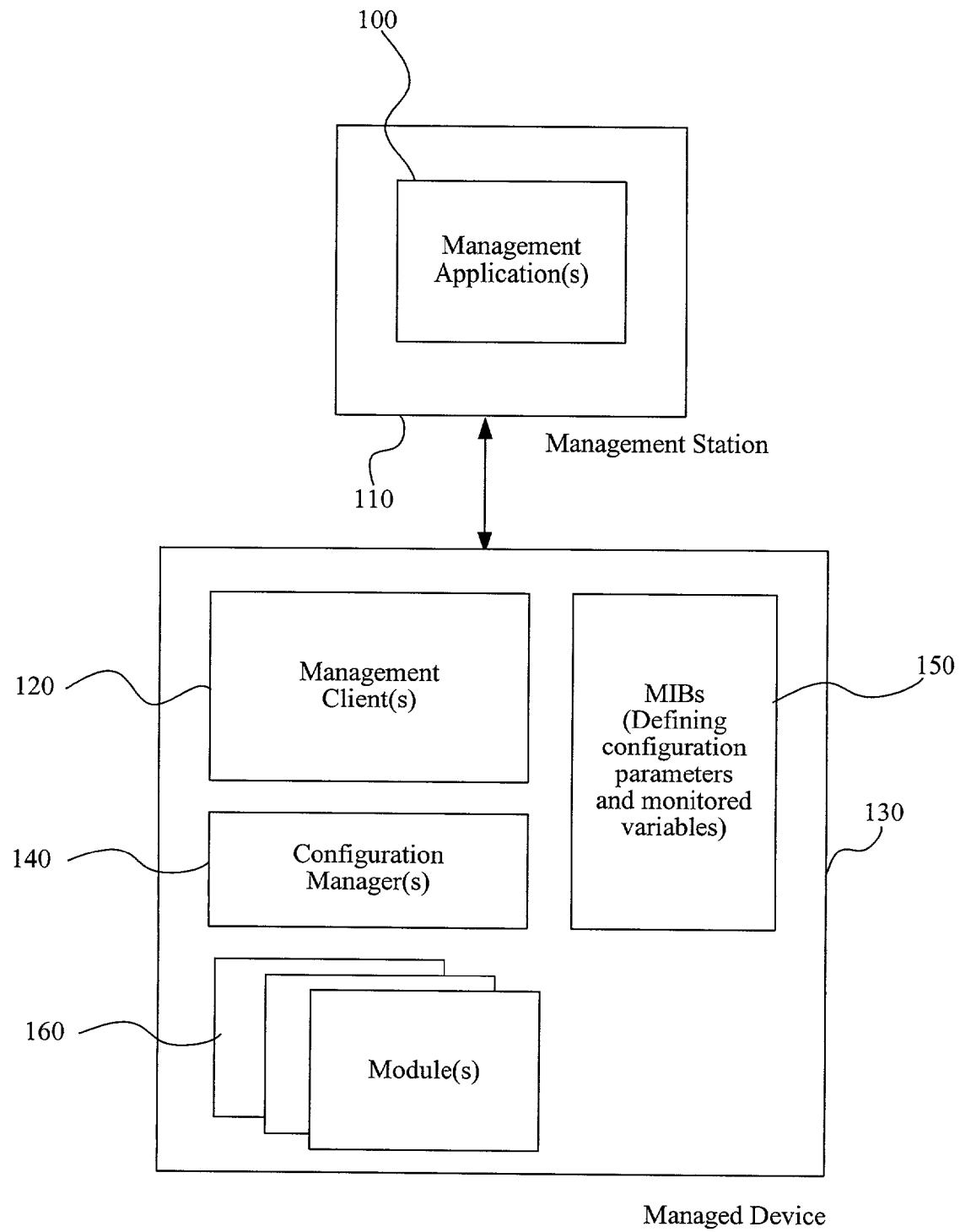
FIG. 1 is high-level block diagram of a managed device including an embedded system software application according to an embodiment of the invention.

As described above, referring to FIG. 1, an embedded systems software application residing in a managed device, which may be a network device (or any other kind of computing device), typically comprises one or more modules 160 coupled together on one or more devices 130 to provide the overall functionality of the application (and consequently of the device(s)). A module is thus a configurable piece of embedded systems software implementing a specific functionality. In FLOSS, the modules are typically loosely coupled such that they depend to some extent on each other but a missing or non-enabled related module will not cause a system crash or disruption but merely some degradation of overall functionality of the application.

Further, according to an embodiment of the invention, a device 130 containing embedded systems software may be managed by one or more management applications 100 on one or more management stations 110. A management station is, for example, a device in a network system from which various managed devices in the network system are controlled and configured via the management client(s) 120 and configuration manager(s) 140 on such devices. Typically, a management station is a workstation on a network system of various managed devices and comprises management application software. Such management application software may include Simple Network Management Protocol (SNMP) manager software and/or command-line interface (CLI) terminal software such as Hewlett Packard's OpenView® software, HyperTerminal® software available as part of the Microsoft® Windows® operating system A management client 120 is a portion of the embedded system software on a managed device responsible for receiving configuration parameter change or read requests and/or monitored variable read requests (discussed in more detail below) from management application(s) on one or more management stations and for communicating corresponding or related information to the management application(s) on one or more management stations. The management client (s) passes such requests on for service by appropriate modules in the embedded systems software application via the configuration manager. Typically the management client corresponds with or is designed to specifically interoperate with the particular kind of management application used in the network system.

A configuration manager 140 is embedded systems software responsible for relaying change or read requests from the management client(s) to appropriate servicing modules within the network whether they be on the same device as the configuration manager or on another device in the network system. Such change or read requests are typically GET and SET operations performed on modules "owning" referenced configuration parameter(s) and/or monitored variable(s). The configuration manager software may be physically located anywhere in the network system and on one or more devices.

One or more managed devices in the network system may also comprise a Management Information Base (MIB) database(s) 150 that includes definitions of managed objects, such as modules and parameter/variables therefor, accessed by a network management protocol of the network system and more particularly, for example, defines a set of configuration parameters and monitored variables which a SNMP management station/application can query and/or set in a managed device/module.

As earlier introduced, an embedded systems software application may also comprise one or more configuration parameters, one or more run-time variables and/or one or more monitored variables. Configuration parameters are system-wide entities that help to define and configure specific behavior of modules and thus the entire embedded system. The set of all configuration parameters within and for the embedded system combine to form a configuration parameter database in which each database element corresponding to a configuration parameter is identified by a name. These configuration parameters are directly accessible and have a value set by a management station/application. All configuration parameters have counterpart run-time variables within each module. Run-time variables are entities inside a module set according to the corresponding configuration parameter value. Monitored variables are entities inside a module identified by a name and having values readable from a management station/application. Monitored variables typically report on module operation information such as performance statistics. As discussed above, one or more MIB databases may define the configuration parameters and monitored variables for a embedded system software application for management by, for example, a SNMP management station/application.

Figure 2:
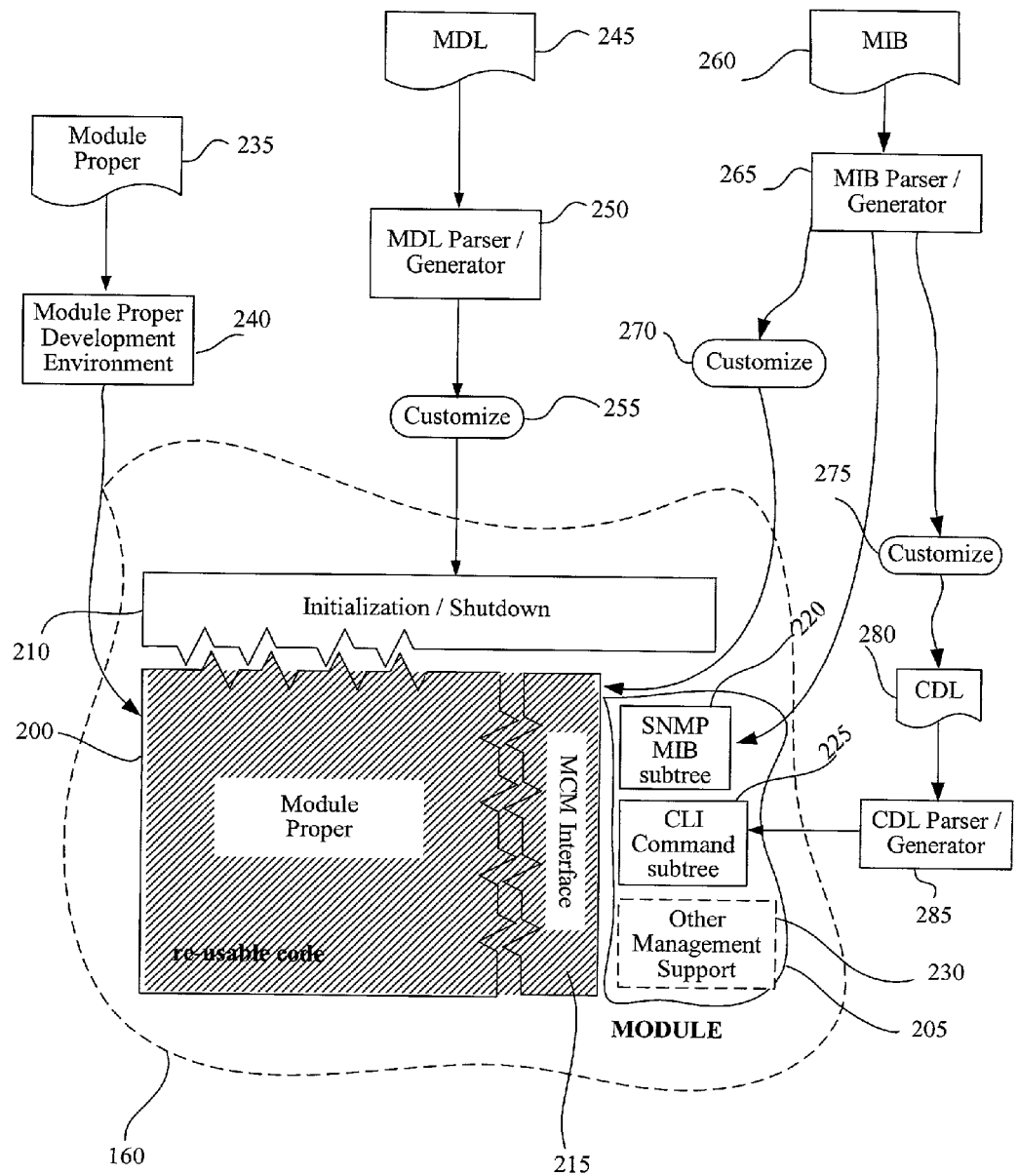
FIG. 2 is a block diagram of the module component of an embedded system software application and the code generation and development toolset according to an embodiment of the invention.

In accordance with an embodiment of the invention and referring to FIG. 2, the module 160 comprises three aspects, namely a module proper 200, an optional management support unit(s) 205 and an initialization/shutdown unit 210. The module proper comprises the module implementation, corresponding to the actual functionality offered by the module, and the management/configuration manager (MCM) interface 215 which acts as an interface between the functional code of the module implementation and the code of any optional management support unit(s) of the module. Through the use of the MCM interface, the module proper is management access type independent thus allowing for, among other things, the re-use of the module proper.

The MCM interface 215 is a unified management interface exposed by all modules and is used to communicate between the configuration manager (via, as the case may be, an optional management support unit(s)) and the module implementation of the module proper. The MCM interface is management access method independent thereby allowing for a variety of optional management support units (as discussed below) to access the functionality of the module proper. The MCM interface provides a number of typical interface functions such as get, get-next, check-set, execute, set default,get default and notify. The functional code of the module proper implements the relevant functional algorithms for the embedded systems software application based on the run-time variable(s) contents. As noted earlier, the functional code typically does not contain any management access method dependent code thereby promoting code reusability and easing code maintenance; rather, such management access method specific code is implemented in the optional management support unit(s) which allows for the removal, addition, and modification of a particular kind of management or interaction with the module proper without having to modify or add the management support functionality of the module proper. The MCM interface acts on "generic" configuration parameter/monitored variable types while the management applications use access-type dependent objects (e.g. SNMP identifies objects with object identification numbers (OIDs), as defined in MIBs; CLI has commands having keywords). In this way, adding any new management support access type in the future does not require changing the module proper and/or the MCM interface; all that is required is adding a new management support unit (described in more detail below) corresponding to the new management support access type of the management application and providing, if necessary, an appropriate management client for interoperating with the management application.

The optional management support unit(s) 205 is management access method specific. The code in the optional management support unit(s) allows for specific kinds of management of and interaction with the module proper such as SNMP management 220, CLI interaction 225 and/or any other specific kind of management/interaction known to those skilled in the art 230. Such management support code would accordingly implement specific functionality according to the kind of management/interaction desired e.g. MIB subtree definitions handled by a given module in the case of the SNMP support, console command subtree definitions handled by a given module in the case of CLI support, and appropriate registration functions. The use of management support units allows for easy extensibility of modules in order to support different kinds of management of and interaction with the module proper.

The third aspect of the module is the initialization/shutdown unit 210. The code of the initialization/shutdown unit is a unified interface exposed by all modules and used to control a module's life cycle, to integrate modules into one manageable entity and to form a module dependency tree. Importantly, the initialization/shutdown unit allows for the shutdown and initialization of a module by, for example, the embedded system software application or a management application e.g. the initialization/shutdown interface code specifies when a module has to be initialized and/or shutdown in relation to all other existing modules and what steps are need inside that module to initialize or shutdown (e.g. allocating resources, registering with system services, configuring parameters, starting and running the module's tasks, etc.). The initialization/shutdown interface also allows for the selection of a set of modules to form a completed embedded system software application for a given network system by, among other things, providing module system integration definitions such as module inter-dependency information. Accordingly, the initialization/shutdown unit is often device dependent. The functional code of the module proper typically does not contain any initialization/shutdown specific code thereby promoting code reusability and easing code maintenance of the module proper; rather, such specific code is typically implemented in the initialization/shutdown interface and so allowing for portability of the module to other embedded systems by not having to modify the module proper for each type of embedded system.

In accordance with the framework described above, there is provided in an embodiment of the invention a toolset to facilitate the code generation and development to create an embedded systems software application from one or more modules implementing specific functionality. This specific functionality is coded using some programming language and is available in a source file 235. In a first aspect of the toolset, there is provided an environment 240 taking the source file as input for developing a management-related portion of the module proper comprising its relevant MCM interface 215. Once the module proper is developed, it can be easily re-used in any further embedded systems software application development projects without any or little modification. The module proper development environment may comprise parsers and/or generators for generating standard code or code according to a higher level language or script for the module proper as well as editors for developing and/or modifying the module implementation and/or the MCM interface.

There is further provided a set of parsers and generators in order to develop the code of the initialization/shutdown unit and of the optional management support unit(s). A first set of parser and generators is the Module Description Language (MDL) parser and code generator 250 taking a MDL source file 245 as input. The MDL parser and code generator is a specialized utility to program to generate the initialization/shutdown glue code of the initialization/shutdown unit based on the parsing of the contents of a MDL file, a file typically specially created for the particular embedded systems software application and the specific device(s) used. The Module Description Language is a proprietary language describing a module's binding to the remainder of the embedded system software application, including a definition of a mailbox for communications, definitions of initialization phases and a list of supported control operations. As would be apparent to those skilled in the art, the MDL need not necessarily be a proprietary language; it need only be a language capable of providing the necessary definitions and instructions to provide for the generation of the initialization/shutdown code. For example, XML could be used with an appropriate DTD. The MDL parser and generator utility also comprises a facility to customize the generated code as required. Once the code for the initialization/shutdown unit is generated, it may be further customized 255 to provide additional initialization/shutdown support functions.

Another set of parsers and generators are provided for generation of code to support management of the module. In an embodiment of the invention, there is provided a Management Information Base (MIB) parser and code generator 265 taking as input a MIB 260 to generate code for use for management support of the module by analyzing a MIB, detecting any errors therein and generating the relevant code matching the abstract data model defined in the MIB. The MIB parser and code generator may also be used to generate management support code for the module to handle configuration parameters and monitored variables. In other words, MIB notation is used to define all managed objects (e.g. modules, configuration parameters, monitored variables, etc.) and from that definition the MIB parser and code generator generates code for use in management support of the module. Particularly, the MIB parser and code generator may be used to generate the optional SNMP management support unit 220. Further, the MIB parser and code generator may be used to generate MCM interface 215 skeleton functions. And, the MIB parser and code generator may be used to generate a CDL file 280 for use by the CDL parser and command table generator 285 in generating the code for a CLI management support unit 225 (as described in more detail below). In this manner, all access methods of the module take advantage of automatically generated code that is compatible with the MIB definitions that define in a single place the configured and monitored variables of an embedded system software application. The MIB parser and generator uses parsing and code generation techniques known to those in the art to create the implementation code. Once the MIB parser and generator code is generated, it may be further customized 270 to provide, for example, specific handling of default configuration parameters, monitored variables and execute and notify functions in the case of code generated for the MCM interface of the module proper. In the case of CDL generated code, the customization 275 of user-preferred command syntax may be done.

There is also provided a Command Description Language (CDL) parser and command table generator 285 taking as input a CDL file 280 for generating code for a CLI management support unit 225. The CDL parser and command table generator is a specialized utility to translate the contents of a CDL file into tables (in this case C language tables) which are combined with other CLI management support code to parse and execute corresponding commands in the CLI management support unit. The Command Description Language is a proprietary language used to define CLI commands as well as enabling to specify all necessary checks, help texts, etc. Like the MDL, the CDL need not necessarily be a proprietary language; it need only be a language capable of providing the necessary definitions and instructions to provide for the generation of the tables needed for the CLI management support unit. For example, XML could be used with an appropriate DTD. Further, the CDL parser and command table generator may also use a CDL file generated by the MIB parser and code generator to generate the code for the CLI management support unit.

Once modules are created using and according to the framework and/or toolset described above, it becomes a simple matter of integrating them together to form an embedded systems software application using known techniques and development utilities. The various utilities and other tools of the above-described code generation and configuration toolset may be integrated into a single software tool comprising graphical user interface editors. As should be apparent to those skilled in the art, each of those utilities could also be provided separately or in any combination and optionally may be provided without a graphical user interface.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the invention is not limiting of the invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the invention based on the description herein with only a reasonable effort and without undue experimentation.

A procedure is here, and generally, conceived to be a self-consistent sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the invention described herein; the operations are machine operations. Useful machines for performing the operations of the invention include general purpose digital computers, special purpose computers or similar devices.

Each operation of the method may be executed on any general computer, such as a mainframe computer, personal computer or the like and pursuant to one or more, or a part of one or more, program modules or objects generated from any programming language, such as the C++, Java®, Fortran, and other programming languages. And still further, each operation, or a file, module, object or the like implementing each operation, may be executed by special purpose hardware or a circuit module designed for that purpose. For example, the invention may be implemented as a firmware program loaded into non-volatile storage or a software program loaded from or into a data storage medium as machine-readable code, such code being instructions executable by an array of logic elements such as a microprocessor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted herein, they are provided by way of example. There may be variations to these diagrams or the operations described herein without departing from the spirit of the invention. For instance, in certain cases, the operations may be performed in differing order, or operations may be added, deleted or modified.

An embodiment of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product. Such an article of manufacture, program storage device or computer program product may include, but is not limited to, CD-ROM, CD-R, CD-RW, diskettes, tapes, hard drives, computer system memory (e.g. RAM or ROM), and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, whether magnetic, biological, optical, or the like, for storing or transmitting signals readable by a machine for controlling the operation of a general or special purpose computer according to the method of the invention and/or to structure its components in accordance with a system of the invention.

An embodiment of the invention may also be implemented in a system. A system may comprise a computer that includes a processor and a memory device and optionally, a storage device, an output device such as a video display and/or an input device such as a keyboard or computer mouse and a network interface. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While this invention has been described in relation to certain embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention Changes, including equivalent structures, acts, materials, etc., may be made, within the purview of the appended claims, without departing from the scope and spirit of the invention in its aspects. Thus, it should be understood that the above described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

What is claimed:

1. A toolset to facilitate code generation and development for creating an embedded systems software application from one or more modules implementing specific functionality, comprising:
   a computing environment to develop an initialization/shutdown unit that allows for shutdown and initialization of the module; and
   a computing environment to develop a module proper that provides the functionality of the module, the module proper having a management interface used to communicate between the module proper and a configuration manager or one or more configuration management units such that the module proper is management access type independent,
   wherein code comprising the initialization/shutdown unit and module proper are provided as separate components of a managed device, the managed device to provide modular and configurable functionality, and wherein functional code of the module proper implements relevant functional algorithms for the embedded systems software application based on run-time variables, and wherein management access method dependent code is external to the module proper, thereby promoting code reusability and maintainability.

2. The toolset of claim 1, further comprising a computing environment to develop one or more configuration management units that provide specific management of and interaction with the module proper.

3. The toolset of claim 2, wherein the environment to develop one or more configuration management units comprises a management information base (MIB) parser and generator to generate code for the one or more configuration management units by analyzing a MIB, detecting any errors in the MIB, and generating the code to match an abstract data model defined in the MIB.

4. The toolset of claim 3, wherein the MIB parser and generator is used to generate management and configuration manager skeleton functions.

5. The toolset of claim 2, wherein the environment to develop one or more configuration management units comprises a command description language (CDL) parser and generator to generate code for the one or more configuration management units according to a command description language file.

6. The toolset of claim 5, wherein the CDL parser and generator uses a command description language file generated by a MIB parser and code generator.

7. The toolset of claim 1, wherein the environment to develop a module proper comprises a parser and generator to generate a management-relation code portion of the module proper according to a higher level language or script and an editor to develop and modify the module proper.

8. The toolset of claim 1, wherein the environment to develop an initialization/shutdown unit comprises a parser and generator to generate code of the initialization/shutdown unit according to a module description language file and an editor to develop and modify the initialization/shutdown unit.

9. The toolset of claim 8, wherein the module description language describes a module's binding to the remainder of the embedded systems software application, including a definition of a mailbox for communications, definitions for initialization phases and a list of supported control operations.

10. A computer-implemented method for generating and developing code for creating an embedded systems software application from one or more modules implementing specific functionality, comprising:
    developing an initialization/shutdown unit that allows for shutdown and initialization of the module; and
    developing a module proper that provides the functionality of the module, the module proper having a management interface used to communicate between the module proper and a configuration manager or one or more configuration management units such that the module proper is management access type independent, wherein code comprising the initialization/shutdown unit and module proper are provided as separate components of the embedded systems software application.

11. The computer-implemented method of claim 10, further comprising developing one or more configuration management units that provide specific management of and interaction with the module proper.

12. The computer-implemented method of claim 10, wherein developing one or more configuration management units comprises generating code for the one or more configuration management units by analyzing a Management Information Base (MIB), detecting any errors in the MIB, and generating the code to match an abstract data model defined in the MIB.

13. The computer-implemented method of claim 12, wherein developing one or more configuration management units further comprises generating management and configuration manager skeleton functions.

14. The computer-implemented method of claim 10, wherein developing one or more configuration management units comprises generating the code of the one or more configuration management units according to a command description language file.

15. The computer-implemented method of claim 14, wherein generating the code of the one or more configuration management units uses a command description language file generated from an analysis of a MIB.

16. The computer-implemented method of claim 10, wherein developing a module proper comprises generating a management-related portion of the code of the module proper according to a higher level language or script and editing the code of the module proper to develop and modify the module proper.

17. The computer-implemented method of claim 10, wherein developing an initialization/shutdown unit comprises generating code of the initialization/shutdown unit according to a module description language file and editing the code of the initialization/shutdown unit to develop and modify the initialization/shutdown unit.

18. The computer-implemented method of claim 17, wherein the module description language describes a module's binding to the remainder of the embedded systems software application, including a definition of a mailbox for communications, definitions for initialization phases and a list of supported control operations.

19. A tangible machine readable medium having instructions for generating reusable code modules for embedded systems, that when executed cause the machine to:
generate code to create an embedded systems software application from one or more modules implementing specific functionality;
develop an initialization/shutdown unit that allows for shutdown and initialization of a reusable software module for the embedded system; and
develop a module proper to provide functionality of the reusable software module, the module proper having a management interface used to communicate between the module proper and one of a configuration manager and at least one configuration unit, wherein the module proper is management access type independent, and wherein code comprising the initialization/shutdown unit and module proper are provided as separate components of the systems software application.

20. The tangible machine readable medium as recited in claim 19, further comprising instructions that when executed develop one or more configuration management units to provide specific management of and interaction with the module proper.

21. The tangible machine readable medium as recited in claim 19, wherein developing one or more configuration management units comprises instructions to analyze a Management Information Base (MID), to detect errors in the MID, and to generate code to match an abstract data model defined in the MIB.

22. The tangible machine readable medium as recited in claim 21, wherein developing one or more configuration management units further comprises instructions to generate management and configuration manager skeleton functions.

23. The tangible machine readable medium as recited in claim 19, wherein developing one or more configuration management units comprises instructions to generate code of the one or more configuration management units according to a command description language file.

24. The tangible machine readable medium as recited in claim 23, wherein generating the code of the one or more configuration management units uses a command description language file generated from an analysis of a Management Information Base (MIB).

25. The tangible machine readable medium as recited in claim 19, wherein developing a module proper comprises instructions to generate a management-related portion of the code of the module proper according to a higher level language or script and to edit the code of the module proper to develop and modify the module proper.

26. The tangible machine readable medium as recited in claim 19, wherein developing an initialization/shutdown unit comprises instructions to generate code of the initialization/shutdown unit according to a module description language file and to edit the code of the initialization/shutdown unit to develop and modify the initialization/shutdown unit.

27. The tangible machine readable medium as recited in claim 26, wherein the module description language describes a module's binding to the remainder of the embedded systems software application, including a definition of a mailbox for communications, definitions for initialization phases and a list of supported control operations.

28. A managed device comprising:
at least one configuration manager;
at least one management client to communicate with an external management application and at least one embedded systems software application module via the at least one configuration manager, the at least one management client to receive and forward requests for configuration parameter change requests, read requests and monitored variable read requests, the requests sent from a management application, and the requests forwarded to an embedded systems software application module;
the at least one embedded systems software application module comprising:
an initialization/shutdown unit that allows for shutdown and initialization of the embedded module; and
a module proper that provides functionality of the embedded module and having a management interface used to communicate between the module proper and the at least one configuration manager, wherein the module proper is management access type independent.

29. The managed device as recited in claim 28, further comprising:
a management information base (MIB), the MIB comprising definitions of managed objects accessible by a network management protocol and defining a set of configuration parameters and monitored variables accessible to the management application, the management application capable of querying and setting parameters and variables in the MIB.

30. The managed device as recited in claim 28, further comprising:
at least one management support unit, each management support unit being management access method specific, wherein code in each management support unit allows for specific kinds of management of and interaction with the module proper,
wherein the module proper further comprises a management and configuration manager (MCM) interface which acts as an interface between functionality of the embedded module and the at least one management support unit.

31. The managed device as recited in claim 28, wherein the initialization/shutdown unit comprises a unified interface exposed by all embedded modules and used to control a module's life cycle, the initialization/shutdown unit to integrate modules into one manageable entity and to form a module dependency tree.

32. The managed device as recited in claim 32, wherein the initialization/shutdown unit allows for the shutdown and initialization of a module by the embedded system software application or a management application.

33. The managed device as recited in claim 28, wherein the at least one embedded systems software application is provided using a toolset to facilitate code generation and development.

34. A machine implemented method for generating reusable code modules for embedded systems comprising:
generating code to create an embedded systems software application from one or more modules implementing specific functionality;
developing an initialization/shutdown unit that allows for shutdown and initialization of a reusable software module for the embedded system; and developing a module proper to provide functionality of the reusable software module, the module proper having a management interface used to communicate between the module proper and one of a configuration manager or at least one configuration management units, wherein the module proper is management access type independent, wherein the developed initialization/shutdown unit and developed module proper are provided as separate components of an embedded systems software application in a managed device, the managed device to provide modular and configurable functionality, and wherein functional code of the module proper implements relevant functional algorithms for the embedded systems software application based on run-time variables, and wherein management access method dependent code is external to the module proper, thereby promoting code reusability and maintainability.

35. The method as recited in claim 34, further comprising developing one or more configuration management units to provide specific management of and interaction with the module proper.

36. The method as recited in claim 35, wherein developing one or more configuration management units comprises:

analyzing a Management Information Base (MIB);

detecting errors in the MIB; and generating code to match an abstract data model defined in the MIB.

37. The method as recited in claim 36, wherein developing one or more configuration management units further comprises generating management and configuration manager skeleton functions.

38. The method as recited in claim 35, wherein developing one or more configuration management units comprises generating code of the one or more configuration management units according to a command description language file.

39. The method as recited in claim 34, wherein developing a module proper comprises generating a management-related portion of the code of the module proper according to a higher level language or script and editing the code of the module proper to develop and modify the module proper.

40. The method as recited in claim 34, wherein developing an initialization/shutdown unit comprises generating code of the initialization/shutdown unit according to a module description language file and editing the code of the initialization/shutdown unit to develop and modify the initialization/shutdown unit.

* * * * *